Patented Dec. 16, 1947

2,432,549

UNITED STATES PATENT OFFICE 2,432,549

DIAZOTYPE LAYERS CONTAINING THIOUREA DERIVATIVES OF HYDROXY BENZENE

William Henry von Glahn, Loudonville, and Lester Nelson Stanley, Delmar, N. Y., assignors to General Aniline & Film Corporation, New York, N. Y., a corporation of Delaware No Drawing. Application December 12, 1945, Serial No. 634,626

8 Claims. (Cl. 95—6)

This invention relates to diazotype processes and more particularly to the use of certain azo components in this art.

With the aid of the new azo components forming an object of this invention, very useful light-sensitive materials and prints of very good quality can be obtained.

In the reproduction of mechanical drawings, printed material, pictures or other originals to be copied, it is of particular advantage to first make an intermeditae print or transition print on a transparent diazotype copying material by juxtapositioning the original to be reproduced to the transparent diazotype material and exposing to actinic rays by either printing through or by the reflex process and then developing the diazotype material. The image produced on the thus obtained intermediate or transition diazotype print can then be used for the reproduction of further prints. The efficiency of such transition prints depends upon the opacity of the azo dye image to ultraviolet light and the transparency of the background. When the transparent diazotype intermediate material contains azo dye components, such as phloroglucin, the diazotype layer has poor stability against precoupling prior to exposure. A print of a deep color having good visual density can be obtained from such a diazotype, but its actinic opacity or photographic density is not sufficient to reproduce satisfactorily subsequent diazotype copies. The azo dye component must be such as to produce by coupling with the undecomposed diazo compound a yellow to brown azo dye which will sufficiently absorb ultraviolet light to prevent light decomposition of the diazo compound in the areas to be reproduced from the intermediate or transition copy.

Azo components such as resorcinol have heretofore been employed in diazotype transition print media for the production of color images having the proper light absorption characteristics for transition printing. While the resorcinol and the like components produce the image in azo dye colors having good opacity to ultraviolet light, the precoupling stability of the diazotype layer is not sufficient to assure prolonged storage before use. It has been found that transparent paper or film carrying the usual diazo compounds and resorcinol in the light-sensitive layer for this purpose gradually develop a discoloration prior to use, produced by premature coupling and hence upon subsequent use the background areas will contain this discoloration, thus impairing the ability of these areas to transmit actinic light. Therefore, it is not possible to obtain a colorless background in subsequent reproductions obtained from the use of the transition print as an original and as a consequence such reproductions do not exhibit full density of the image and are not clear.

It has now been found that a new class of azo coupling components, not heretofore used in diazotype reproduction media, may be employed in a light-sensitive layer with suitable diazo compounds on a transparentized paper or film or other transparent carrier which will give a sepia image of high actinic opacity and at the same time provide a two-component diazotype light-sensitive layer of high stability to precoupling. This class of coupling components includes the 2-, 3-, and 4-thiourea derivatives of hydroxy benzene compounds which may be represented by the following general formula:

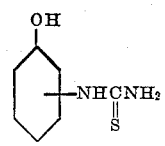

The ring may be further substituted by any of the usual substituents for phenolic coupling components, such as alkyl, halogen, SO$_3$H, alkoxy, carbalkoxy and sulfamide groups, provided that at least one position ortho to the phenolic group or the para position to the phenolic group is left unsubstituted and the thiourea radical may be substituted by such usual substituents as alkyl, aryl and aralkyl groups. Members of this class of compounds include 3-hydroxy phenyl thiourea, 2-hydroxy phenyl thiourea, and 4-hydroxy phenyl thiourea, and substituted derivatives of these, as indicated above.

Processes for the production of these thiourea derivatives of hydroxy benzene compounds are described in Beilstein 13, 417; Berichte 32, 2115; Beilstein 13, 478 and Beilstein 13, 376.

Although this invention will be particularly described as applied to the two-component diazotype reproduction method which is the preferred embodiment, it is understood that it can as well be applied to the one-component process or moist developing process. Accordingly, acceptable transition prints can be made by developing an exposed diazotype layer on a transparent medium containing the diazo compound as the only dye component with an alkaline developing solution containing the hydroxy phenyl thiourea coupling component of this process.

In the preparation of diazotype two-component layers for the preparation of intermediate or transition prints in accordance with this invention, a suitable transparent support, such as transparentized paper, cellulose acetate film or other transparent material is coated by means known to the art with a light-sensitive composition containing suitable diazo compounds and the new coupling components in combination with such other materials as are ordinarily used in the preparation of diazotype two-component light-sensitive coating compositions. As diazo compounds, those derived from p-diamines of the benzene series, particularly those in which one of the amino groups is substituted by such groups as alkyl, alkoxyalkyl, aryl, aralkyl, alkylol, cycloaliphatic, and heterocyclic groups are preferred, although others have been found suitable. Examples of such amines are N-hydroxyethyl-N-methylamino p-amino benzene, p-amino diphenylamine, 1-monoethylamino-2-(or 3-)methyl-4-amino benzene, 1-N-hydroxyethyl-N-ethylamino-3-methyl-4-amino benzene, 1-diethylamino-3-ethoxy-4-amino benzene, 4-amino-1-benzoylamino-2,5-diethoxy benzene, p-amino-N-diethylaniline, 1-N,N-di(hydroxyethyl)amino-3-chloro-4-amino benzene, p-amino-N-ethyl-N-benzylaniline, p-amino-N-dimethylaniline, 1-ethylamino-4-aminobenzene, 1-hydroxy ethyl-ethylamino-4-amino benzene, p-phenylene diamine, 4-amino-N,N-dioxyalkylaniline and 4'-ethoxyphenyl-2,5-diethoxyaniline. The diazo compounds are used in the form of their stabilized salts, such as the $ZnCl_2$, $CdCl_2$ or $SnCl_4$ double salts, fluorborates, aryl or alkyl sulfonates and acid sulfates of the diazonium compound.

The following examples will serve to illustrate this invention, but they are not intended to limit it thereto.

*Example 1*

Transparentized paper is coated with a coating solution containing the following materials per 100 cc. of water having an isopropanol content of 10%:

| | Grams |
|---|---|
| 3-hydroxy phenyl thiourea | 3.8 |
| N-hydroxyethyl-N-methylamino p-benzene diazonium chloride-$ZnCl_2$ double salt | 3.3 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 2*

Transparentized paper is coated with a coating solution containing the following materials per 100 cc. of water having an isopropanol content of 10%:

| | Grams |
|---|---|
| 3-hydroxy phenyl thiourea | 3.8 |
| 1-(N-hydroxyethyl-N-ethyl)amino-3-methyl-4-benzene diazonium chloride-$ZnCl_2$ double salt | 3.5 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 3*

Transparentized paper is coated with a coating solution containing the following materials per 100 cc. of water having an isopropanol content of 10%:

| | Grams |
|---|---|
| 3-hydroxy phenyl thiourea | 3.8 |
| 2,5,4'-triethoxy diphenyl-4-diazonium acid sulfate | 3.1 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 4*

Transparentized paper is coated with a coating solution containing the following materials per 100 cc. of water having an isopropanol content of 10%:

| | Grams |
|---|---|
| 3-hydroxy phenyl thiourea | 3.8 |
| 1-benzoylamino-2,5-diethoxy-4-benzene diazonium chloride-$ZnCl_2$ double salt | 3.5 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 5*

Transparentized paper is coated with a coating solution containing the following materials per 100 cc. of water having an isopropanol content of 10%:

| | Grams |
|---|---|
| 3-hydroxy phenyl thiourea | 2.1 |
| N-diethylamino-p-benzene diazonium chloride-$ZnCl_2$ double salt | 4.4 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 6*

Transparentized paper is coated with a coating solution containing the following materials per 100 cc. of water having an isopropanol content of 10%:

| | Grams |
|---|---|
| 2-hydroxy phenyl thiourea | 3.8 |
| p-Phenylamino benzene diazonium acid sulfate | 3.2 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

*Example 7*

Transparentized paper is coated with a coating solution containing the following materials per 100 cc. of water having an isopropanol content of 10%:

| | Grams |
|---|---|
| 4-hydroxy phenyl thiourea | 3.8 |
| 1-ethylamino-3-methyl-4-benzene diazonium chloride-ZnCl$_2$ double salt | 3.1 |
| Citric acid | 8.0 |
| Thiourea | 4.0 |

The coated transparency has excellent precoupling stability and when exposed to ultraviolet light under a positive original and developed with gaseous ammonia gives a sepia dye positive reproduction of the original on a clear background. This sepia dye reproduction on the transparentized paper has very good opacity to ultraviolet light under the sepia dye image areas and upon subsequent exposure and development of an ordinary diazotype reproduction media using the sepia dye image positive as an original, it produces excellent reproductions in any desired color.

We claim:

1. As new products, light-sensitive layers on a suitable base containing a suitable light-sensitive diazo compound and an azo coupling component selected from the class consisting of 2-, 3-, and 4-hydroxy phenyl thiourea compounds unsubstituted at at least one of the positions ortho and para to the hydroxy group.

2. As new products, light-sensitive layers on a suitable base comprising a diazo compound derived from a p-diamino compound of the benzene series and an azo coupling component of the class consisting of compounds having the formula:

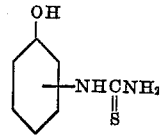

3. As a new product, light-sensitive layer on a suitable base comprising a diazo derivative of a p-diamino compound of the benzene series and 2-hydroxy phenyl thiourea.

4. As a new product, a light-sensitive layer on a suitable base comprising a diazo derivative of a p-diamino compound of the benzene series and 3-hydroxy phenyl thiourea.

5. As a new product, a light-sensitive layer on a suitable base comprising a diazo derivative of a p-diamino compound of the benzene series and 4-hydroxy phenyl thiourea.

6. As a new product, a light-sensitive layer on a suitable base comprising the stabilized salt complex of N-hydroxyethyl-N-methylamino-p-benzene diazonium chloride and 3-hydroxy phenyl thiourea.

7. As a new product, a light sensitive layer on a suitable base comprising p-phenylaminobenzene diazonium acid sulfate and 2-hydroxy phenyl thiourea.

8. As a new product, a light sensitive layer on a suitable base comprising the stabilized salt complex of 1-ethyl amino-3-methyl-4-benzene diazonium chloride and 4-hydroxy phenyl thiourea.

WILLIAM HENRY von GLAHN.
LESTER NELSON STANLEY.